(12) United States Patent
Tomii et al.

(10) Patent No.: US 12,502,143 B2
(45) Date of Patent: Dec. 23, 2025

(54) METHOD FOR ESTIMATING ARRANGEMENT OF ELECTRODES ON BIOLOGICAL TISSUE

(71) Applicant: THE UNIVERSITY OF TOKYO, Tokyo (JP)

(72) Inventors: Naoki Tomii, Tokyo (JP); Ichiro Sakuma, Tokyo (JP); Masatoshi Yamazaki, Tokyo (JP); Jiaming Jiao, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 968 days.

(21) Appl. No.: 17/424,967

(22) PCT Filed: Jan. 24, 2020

(86) PCT No.: PCT/JP2020/002483
§ 371 (c)(1),
(2) Date: Feb. 16, 2022

(87) PCT Pub. No.: WO2020/153468
PCT Pub. Date: Jul. 30, 2020

(65) Prior Publication Data
US 2022/0175315 A1    Jun. 9, 2022

(30) Foreign Application Priority Data

Jan. 25, 2019  (JP) .................. 2019-010999

(51) Int. Cl.
*A61B 5/00*  (2006.01)
*A61B 5/25*  (2021.01)

(52) U.S. Cl.
CPC .............. *A61B 5/7278* (2013.01); *A61B 5/25* (2021.01); *A61B 5/684* (2013.01); *A61B 2562/04* (2013.01)

(58) Field of Classification Search
CPC ........... A61B 34/10; A61B 5/684; A61B 5/25; A61B 2562/04; A61B 5/7278; A61B 5/7264; A61B 2560/0223
See application file for complete search history.

(56) References Cited

U.S. PATENT DOCUMENTS

2011/0144715 A1 *  6/2011  Molnar .............. A61N 1/36185
                                                                607/45
2015/0157220 A1 *  6/2015  Fish ..................... A61B 5/0002
                                                                600/595

(Continued)

FOREIGN PATENT DOCUMENTS

CN        108937968 A  * 12/2018  ............. A61B 5/369
CN        111297322 A  *  6/2020  ............. A61B 5/389

(Continued)

OTHER PUBLICATIONS

Van Dam. Present State of the Art of Body Surface Mapping. 1987. (Year: 1987).*

(Continued)

*Primary Examiner* — Jennifer Pitrak McDonald
*Assistant Examiner* — Christine Sison
(74) *Attorney, Agent, or Firm* — Oliff PLC

(57) ABSTRACT

A method for estimating an arrangement of electrodes obtains detection signals when an initial electrode array having a sufficient number of electrodes for detection of excitation wave arranged and arrayed in a plane is attached to biological tissue. The method uses a plurality of input data based on detection signals obtained in a plurality of second electrode arrays generated by eliminating a predetermined number of electrodes at random from the initial electrode array, and uses an image of excitation wave in a process of obtaining the detection signals by using the initial electrode array, as teacher data, obtaining a learned model by deep learning. The method selects a second electrode array cor- (Continued)

responding to an analysis image that is best matched with the image of the teacher data, among a plurality of analysis images obtained by applying the plurality of input data to the learned model, as a selective electrode array.

6 Claims, 8 Drawing Sheets

(56) References Cited

U.S. PATENT DOCUMENTS

| | | | |
|---|---|---|---|
| 2015/0257845 A1* | 9/2015 | Gopalakrishna | A61B 34/20 600/424 |
| 2017/0301102 A1 | 10/2017 | Urman et al. | |
| 2018/0184937 A1* | 7/2018 | Kaddan | A61B 5/7267 |
| 2019/0196586 A1* | 6/2019 | Laszlo | A61B 5/372 |
| 2019/0321106 A1* | 10/2019 | Bergman | A61B 34/20 |
| 2019/0380621 A1* | 12/2019 | Ando | G08G 1/16 |
| 2020/0037908 A1 | 2/2020 | Sakuma et al. | |
| 2020/0187808 A1* | 6/2020 | Yang | A61B 5/0008 |
| 2024/0108272 A1* | 4/2024 | Hendler | A61B 5/372 |
| 2024/0130681 A1* | 4/2024 | Rittaler | G06F 3/015 |

FOREIGN PATENT DOCUMENTS

| | | |
|---|---|---|
| JP | H08-140954 A | 6/1996 |
| JP | 2018-171194 A | 11/2018 |
| WO | 2018/180796 A1 | 10/2018 |

OTHER PUBLICATIONS

Atyabi et al., "Evolutionary feature selection and electrode reduction for EEG classification," 2012 IEEE Congress on Evolutionary Computation, Brisbane, QLD, Australia, 2012, pp. 1-8, doi: 10.1109/CEC.2012.6256130. (Year: 2012).*

Tuyisenge et al., "Automatic bad channel detection in intracranial electroencephalographic recordings using ensemble machine learning", Clinical Neurophysiology, vol. 129, Issue 3, 2018, pp. 548-554, ISSN 1388-2457, https://doi.org/10.1016/j.clinph.2017.12.013. (Year: 2018).*

Truong et al., "Supervised learning in automatic channel selection for epileptic seizure detection", Expert Systems with Applications, vol. 86, 2017, pp. 199-207, ISSN 0957-4174, https://doi.org/10.1016/j.eswa.2017.05.055. (Year: 2017).*

Teplitzky et al., "Model-Based Comparison of Deep Brain Stimulation Array Functionality with Varying Number of Radial Electrodes and Machine Learning Feature Sets", Frontiers in Computational Neuroscience, vol. 10, 2016, ISSN 1662-5188, https://doi.org/10.3389/fncom.2016.00058. (Year: 2016).*

Zheng et al., "Investigating Critical Frequency Bands and Channels for EEG-Based Emotion Recognition with Deep Neural Networks," IEEE Transactions on Autonomous Mental Development, vol. 7, No. 3, pp. 162-175, Sep. 2015, doi: 10.1109/TAMD.2015.2431497. (Year: 2015).*

Shah et al., "Optimizing channel selection for seizure detection," 2017 IEEE Signal Processing in Medicine and Biology Symposium (SPMB), 2017, pp. 1-5, doi: 10.1109/SPMB.2017.8257019. (Year: 2017).*

Feess et al., "Comparison of sensor selection mechanisms for an ERP-based brain-computer interface", PLoS One, 2013, doi: 10.1371/journal.pone.0067543. (Year: 2013).*

Alotaiby et al. (A review of channel selection algorithms for EEG signal processing. EURASIP J. Adv. Signal Process. 2015, 66 (2015). https://doi.org/10.1186/s13634-015-0251-9). (Year: 2015).*

Mar. 31, 2020 International Search Report issued in International Patent Application No. PCT/JP2020/002483.

* cited by examiner

| NUMBER OF ELECTRODES | ELECTRODE ARRAY | SIGNAL MAP | ANALYSIS IMAGE | IMAGE OF TEACHER DATA |
|---|---|---|---|---|
| 25 | | | | |
| 20 | | | | |
| 15 | | | | |
| 10 | | | | |
| 5 | | | | |
| 2 | | | | |

FIG. 11

METHOD FOR ESTIMATING ARRANGEMENT OF ELECTRODES ON BIOLOGICAL TISSUE

TECHNICAL FIELD

The present disclosure relates to a method for estimating an arrangement of electrodes on biological tissue and more specifically to a method for estimating an arrangement of electrodes on biological tissue that estimates the number of and an arrangement of electrodes to be attached to biological tissue, in order to detect excitation wave of the biological tissue that becomes active with excitation by propagation of the excitation wave in the tissue.

BACKGROUND

One proposed technique calculates a phase variance value that indicates the degree of a variance of phase in the periphery of each position, based on the phase of excitation wave at each position of biological tissue that becomes active with excitation by propagation of excitation wave in the tissue, and generates an analysis map, based on a time series of at least part of phase variance values at each position (as described in, for example, Patent Literature 1). The phase variance value indicates the degree of a variance of phase in the periphery. This enables a position having a large degree of a variance of phase in the periphery to be recognized as the center of rotation of rotating excitation wave. The degree of the variance of phase in the periphery is thus likely to be the center of rotation prior to the present time or to be the center of rotation after the present time. Aa a result, the analysis map is a map used to perform an analysis with respect to the rotating excitation wave.

CITATION LIST

Patent Literature

PTL1: 2018-171194A

SUMMARY

Technical Problem

The technique described above requires electrodes to be placed at respective positions of biological tissue, in order to detect the excitation wave at the respective positions of the biological tissue. Attaching the electrodes to the biological tissue applies a load to the biological tissue. It is thus desirable to minimize the number of electrodes required for measurement of a fixed size of a measurement range. Accordingly, it is required to determine the number of and an arrangement of electrodes to be attached to biological tissue for detection of the excitation wave.

A main object of a method for estimating an arrangement of electrodes on biological tissue according to the present disclosure is to estimate a more appropriate arrangement of electrodes for detection of excitation wave of the biological tissue.

Solution to Problem

In order to achieve the main object described above, a method for estimating an arrangement of electrodes on biological tissue according to the present disclosure has aspects described below.

According to one aspect of the present disclosure, there is provided a method for estimating an arrangement of electrodes on biological tissue that estimates a number of and an arrangement of electrodes to be attached to biological tissue, in order to detect excitation wave of the biological tissue that becomes active with excitation by propagation of the excitation wave in the tissue. The method includes a signal obtaining step of setting an initial electrode array having a sufficient number of electrodes for detection of the excitation wave arranged and arrayed in a plane, as a first electrode array, and obtaining detection signals at respective electrodes when the electrodes are attached to the biological tissue by using the initial electrode array; a learned model obtaining step of using a plurality of input data based on detection signals obtained at respective electrodes in a plurality of second electrode arrays that are generated by eliminating a predetermined number of electrodes at random from the first electrode array, using an image of excitation wave in a process of obtaining the detection signals at the respective electrodes by using the initial electrode array, as teacher data, and learning a relationship between the input data and the image of the excitation wave by deep learning, so as to obtain a learned model; an electrode array selecting step of selecting a second electrode array corresponding to an analysis image that is best matched with the image of the teacher data, among a plurality of analysis images obtained by applying the plurality of input data to the learned model, as a selective electrode array; and an electrode arrangement estimating step of specifying the selective electrode array as an optimum electrode array and estimating a number of and an arrangement of electrodes in the optimum electrode array, as the number of and the arrangement of the electrodes to be attached to the biological tissue.

The method for estimating the arrangement of the electrodes on the biological tissue according to this aspect of the present disclosure first obtains detection signals at respective electrodes when the electrodes are attached to the biological tissue by using an initial electrode array having a sufficient number of electrodes for detection of the excitation wave arranged and arranged in a plane. The method subsequently sets the initial electrode array as a first electrode array, uses a plurality of input data based on detection signals obtained at respective electrodes in a plurality of second electrode arrays that are generated by eliminating a predetermined number of electrodes at random from the first electrode array, uses an image of excitation wave in a process of obtaining the detection signals at the respective electrodes by using the initial electrode array, as teacher data, and learns a relationship between the plurality of input data and the image of the excitation wave by deep learning, so as to obtain a learned model. The method subsequently selects a second electrode array corresponding to an analysis image that is best matched with the image of the teacher data, among a plurality of analysis images obtained by applying the plurality of input data to the obtained learned model, as a selective electrode array. The method then specifies the selected selective electrode array as an optimum electrode array and estimates the number of and an arrangement of electrodes in this optimum electrode array, as the number of and the arrangement of the electrodes to be attached to the biological tissue. This configuration enables an electrode array having a most appropriate arrangement of electrodes for detection of the excitation wave of the biological tissue, among the plurality of second electrode arrays generated by eliminating the predetermined number of electrodes from the initial electrode array, to be selected as the optimum electrode array. This configuration accordingly estimates the more appropriate arrangement of the electrodes for detection of the excitation wave of the biological tissue.

In the method for estimating the arrangement of the electrodes on the biological tissue according to the above aspect of the present disclosure, the plurality of input data may be adjusted, based on interpolation signals between electrodes obtained by interpolating detection signals at the electrodes by a nearest neighbor algorithm. This configuration enables the signals between the electrodes to be included in the input data and accordingly obtains the more appropriate learned model. As a result, this configuration estimates the more appropriate arrangement of the electrodes for detection of the excitation wave of the biological tissue.

In the method for estimating the arrangement of the electrodes on the biological tissue according to the above aspect of the present disclosure, the learned model obtaining step and the electrode array selecting step may be performed repeatedly by using the selective electrode array selected by the electrode array selecting step, as the first electrode array. The "predetermined number" in the learned model obtaining step may be an identical value or may be a different value in each cycle of repetition. This configuration enables an electrode array having a less number of electrodes to be selected as the optimum electrode array and estimates the more appropriate arrangement of the less number of electrodes for detection of the excitation wave of the biological tissue. In this aspect, when an analysis image obtained by the selective electrode array is out of an allowable range with respect to the image of the teacher data, the electrode arrangement estimating step may specify the selective electrode array selected in a previous cycle of the electrode array selecting step, as the optimum electrode array. This configuration enables an electrode array having a smallest number of electrodes among electrode arrays corresponding to analysis images that are in the allowable range with respect to the image of the teacher data, to be specified as the optimum electrode array.

BRIEF DESCRIPTION OF DRAWINGS

FIG. 11 is an explanatory diagram illustrating electrode arrays, signal maps and analysis images when the number of electrodes is decreased by five each time from an electrode array having twenty five electrodes arranged and arrayed, along with the image of teacher data.

DESCRIPTION OF EMBODIMENTS

Figure 1:
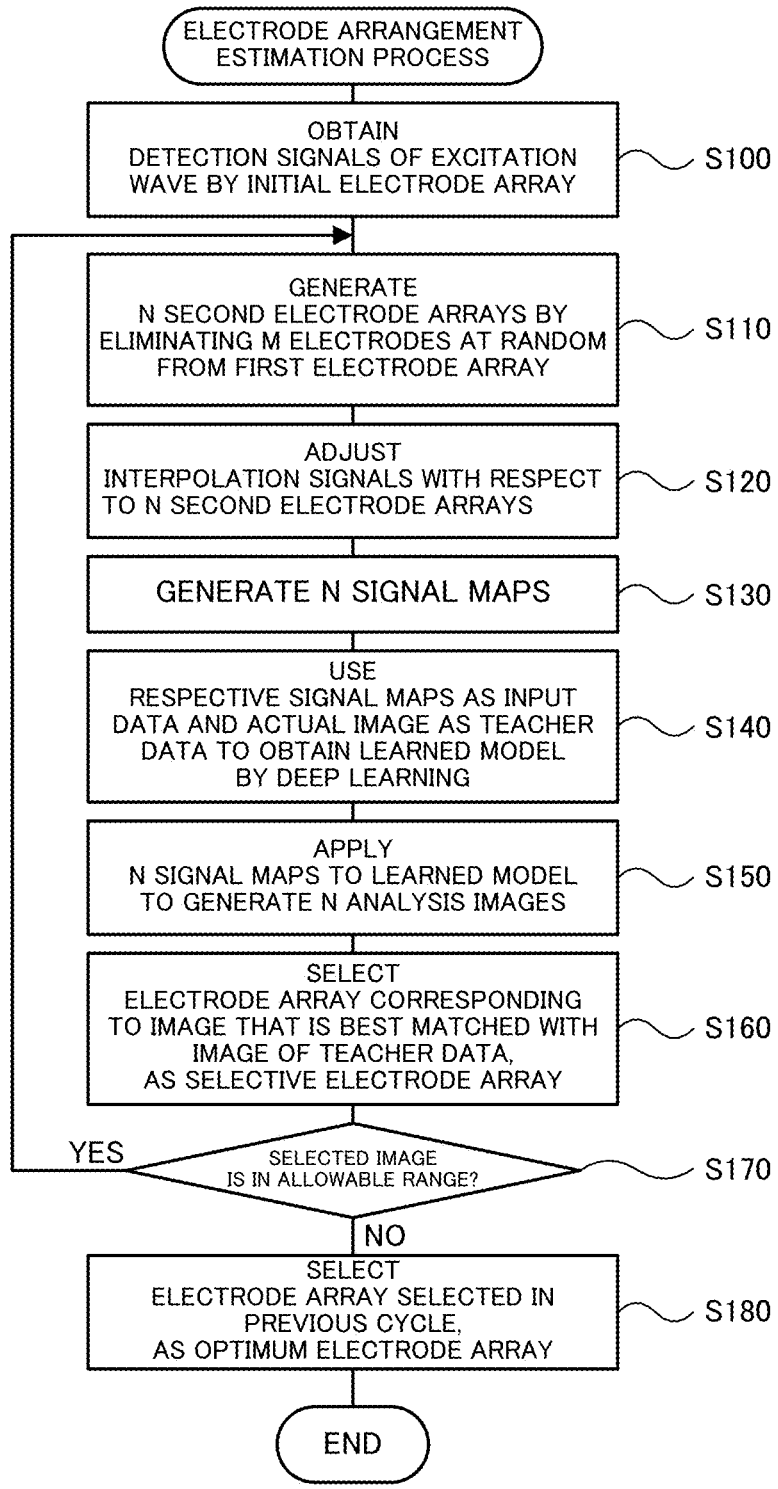
FIG. 1 is a flowchart showing one example of the outline of an electrode arrangement estimation process for biological tissue according to one embodiment.
Figure 2:
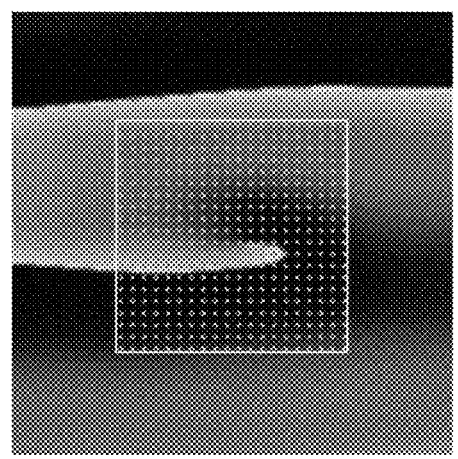
FIG. 2 is an explanatory diagram illustrating one example of an electrode array having the number of electrodes equal to four hundred.
Figure 3:
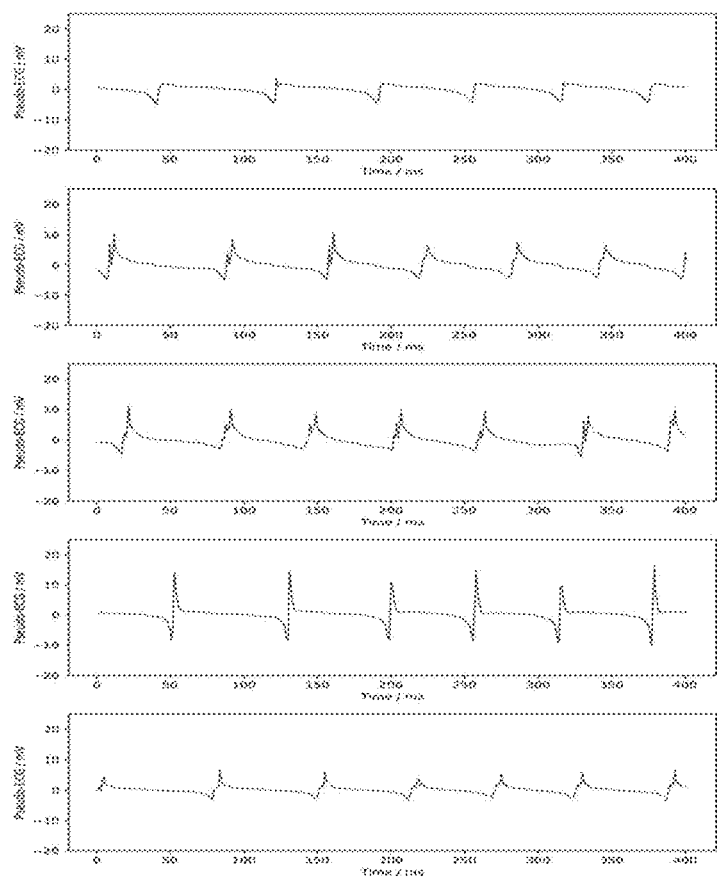
FIG. 3 is an explanatory diagram illustrating one example of detection signals obtained at the respective electrodes of the electrode array shown in FIG. 2.

Embodiments of the present disclosure are described below. FIG. 1 is a flowchart showing one example of the outline of an electrode arrangement estimation process for biological tissue according to one embodiment. The electrode arrangement estimation process first attaches an electrode array (initial electrode array) having a sufficient number of multiple electrodes for detection of excitation wave of biological tissue arranged and arrayed in a plane, to the biological tissue and obtains detection signals of the excitation wave at the respective electrodes (step S100). FIG. 2 illustrates one example of the initial electrode array having the number of electrodes equal to four hundred, and FIG. 3 illustrates one example of the detection signals obtained at the respective electrodes of this initial electrode array. In the example of FIG. 2, the initial electrode array is attached such that the center of the initial electrode array is located at the center of rotation of rotating excitation wave. The detection signals obtained at the respective electrodes are signals indicating voltage changes in excitation wave propagation detected at respective electrode points over time.

Figure 4:
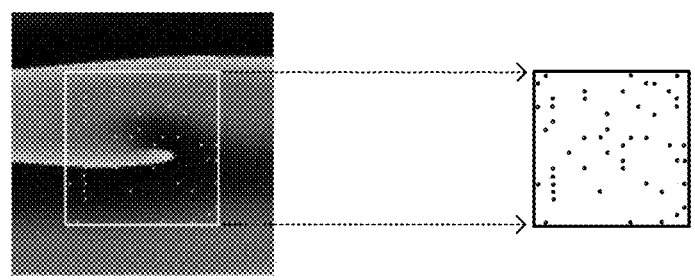
FIG. 4 is an explanatory diagram illustrating one example of an electrode array by eliminating some electrodes.
Figure 5:
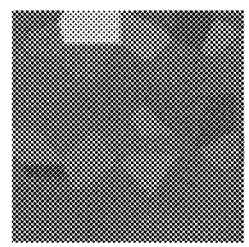
FIG. 5 is an explanatory diagram illustrating one example of a signal map.

The electrode arrangement estimation process subsequently sets the initial electrode array as a first electrode array and generates a number N of second electrode arrays having different electrode arrangements by eliminating a number M of electrodes at random from the first electrode array (step S110). Accordingly, N patterns (N different patterns) of the second electrode arrays are generated. FIG. 4 illustrates one example of the second electrode array generated by eliminating M electrodes from the initial electrode array (the first electrode array). M is a value 1 or is a value of not less than 2, and N is a value of not less than 2. The electrode arrangement estimation process uses the detection signals at the respective electrodes with respect to the N second electrode arrays generated by eliminating the M electrodes as described above to adjust interpolation signals between the electrodes in the respective electrode arrays (step S120) and generates signal maps of the respective electrode arrays by using the detection signals of the respective electrodes and the interpolation signals (step S130). According to the embodiment, the interpolation signals between the electrodes are adjusted by a nearest neighbor algorism. FIG. 5 illustrates one example of the signal map. In the example of the signal map shown in FIG. 5, the intensity of the detection signal is expressed by the density. Both the detection signal and the interpolation signal are time series data that vary with time, so that the signal map is also a time series map (a moving image) that varies with time.

As described later, the electrode arrangement estimation process uses training data to obtain a learned model by deep learning at step S140 and uses test data to evaluate a final inference of the learned model at step S150. A method of generating a data set of training data, test data and the like (a data set including a signal map (a time series map: moving image) mapped to the image of excitation wave (a time series image: moving image) is described as a premise of these steps, with reference to FIG. 6. This is because it is important for the present disclosure to specify a correspondence relationship of mapping the signal map (the moving image) as an input layer in deep learning to the image of excitation wave (moving image) as an output layer in deep learning. In the description hereinafter, the image of excitation wave (a time series image: moving image) may be referred to as "excitation wave map".

Figure 6:
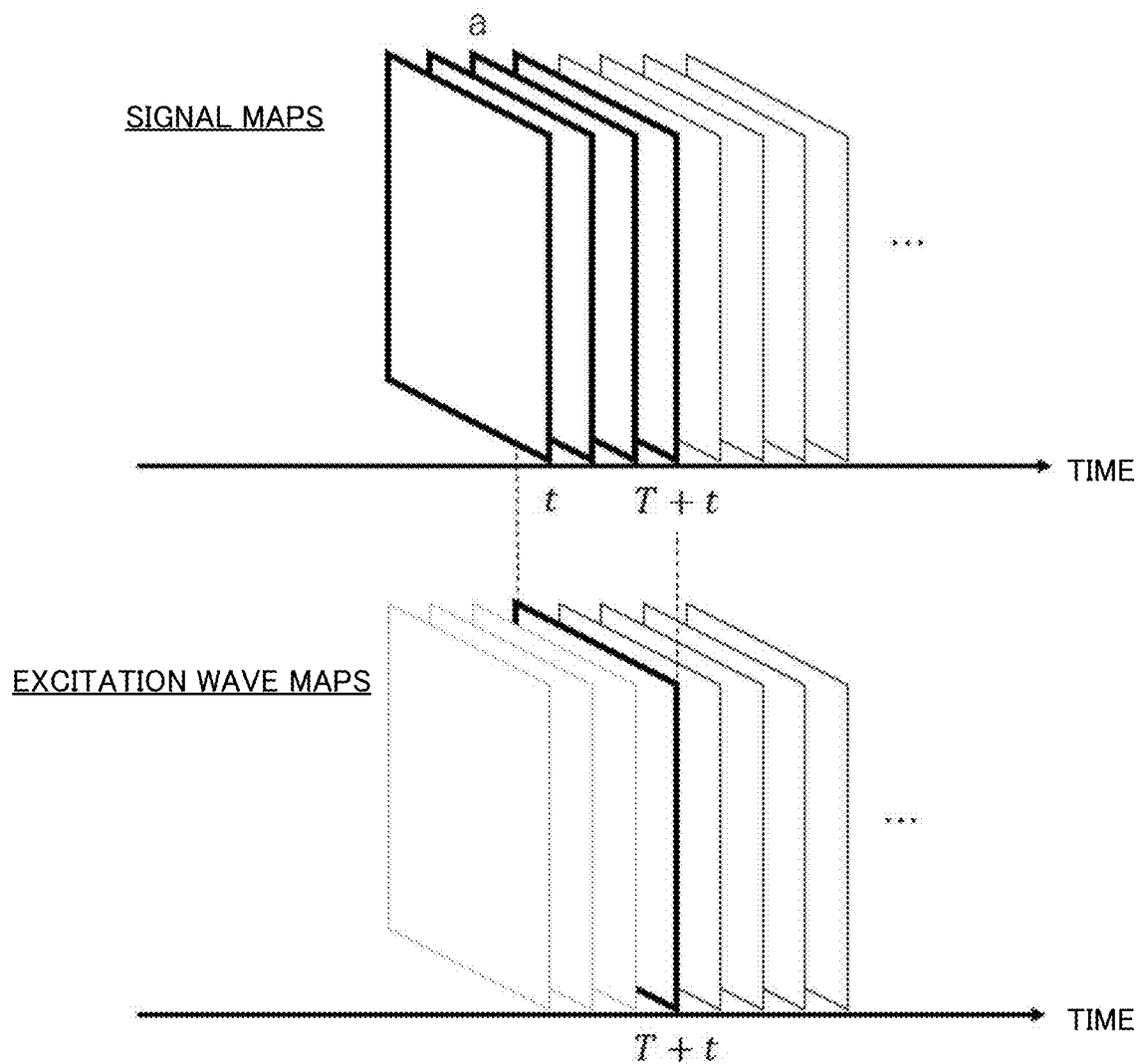
FIG. 6 is a schematic diagram illustrating mapping of signal maps (moving image) to excitation wave maps (moving image)

FIG. 6 is a schematic diagram illustrating mapping of signal maps (a moving image) to excitation wave maps (a moving image). One image of excitation wave (still image) is mapped to last one image (still image) out of signal maps in a predetermined section. More specifically, as shown in FIG. 6, an image of excitation wave (still image) at a time T is mapped to a signal map in a section from a time 0 to the time T (a moving image "a" consisting of four consecutive still images shown by the thick lines in FIG. 6). Similarly, an image of excitation wave (still image) at a time T+t is mapped to a signal map in a section shifted by a predetermined time t from the signal map in the section from the time 0 to the time T (in a section from a time t to the time T+t) ("a" shown in FIG. 6). A signal map having a fixed section length T (moving image) is mapped to an image of excitation wave (still image) in this manner. Such mapping is repeated, so that the signal map (moving image) is mapped to the excitation wave map (moving image). The foregoing describes the example of mapping the time of one image of excitation wave (still image) to one last image (still image) out of the signal map in the predetermined section. The mapping method is, however, not limited to this example. One image of excitation wave may be mapped to an image (still image) at any time among the signal maps in the predetermined section. A lower limit of the predetermined time t is a reciprocal (1/f) of a sampling rate f in the case of converting the detection signals (analog signals) obtained at the electrodes into digital signals.

Figure 7:
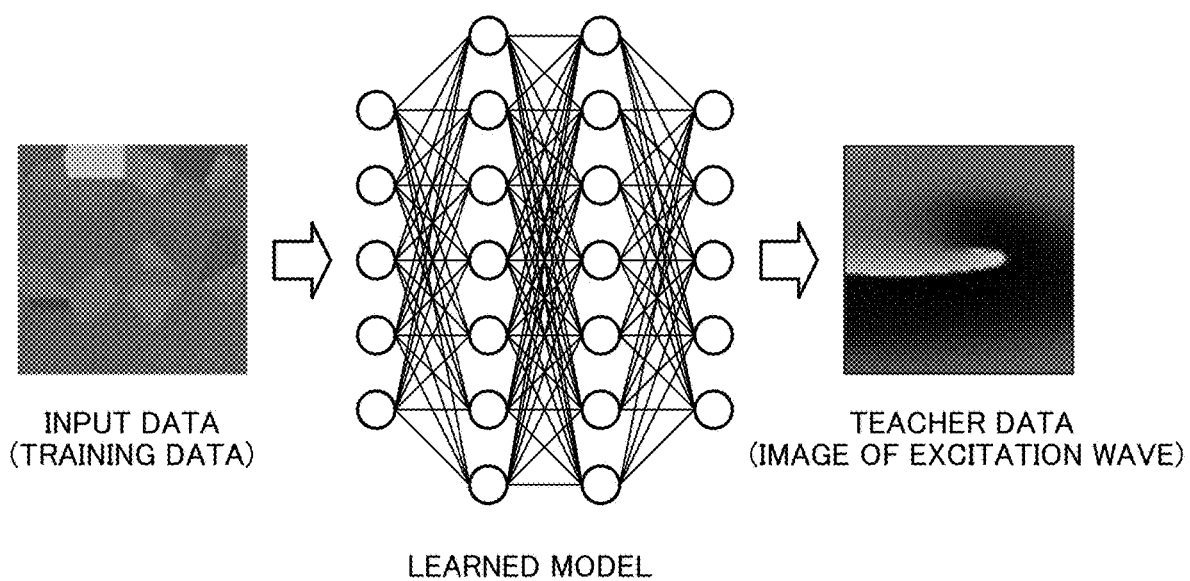
FIG. 7 is an explanatory diagram illustrating the concept of deep learning to obtain a learned model by using input data and teacher data.

By taking into account the foregoing, a procedure of obtaining a learned model by deep learning is described first. Referring back to FIG. 1, as shown at step S140 in FIG. 1, the electrode arrangement estimation process sets the signal map (a times series map) as input data, sets either an image of the excitation wave (a time series image: a moving image) based on the detection signals detected at the respective electrodes in the initial electrode array or an image of the excitation wave (a time series image: a moving image) based on the signals measured by a technique other than electrical measurement, for example, optical measurement, as teacher data, and obtains a learning result of a relationship between the input data and an image indicating propagation of the excitation wave (a moving image) by deep learning, as a learned model (step S140). FIG. 7 illustrates the concept of deep learning to obtain a learned model by using input data and teacher data. As described above, there are N patterns (N different patterns) of the second electrode arrays. Accordingly, the learned models obtained are N learned models corresponding to the respective patterns.

Figure 8:
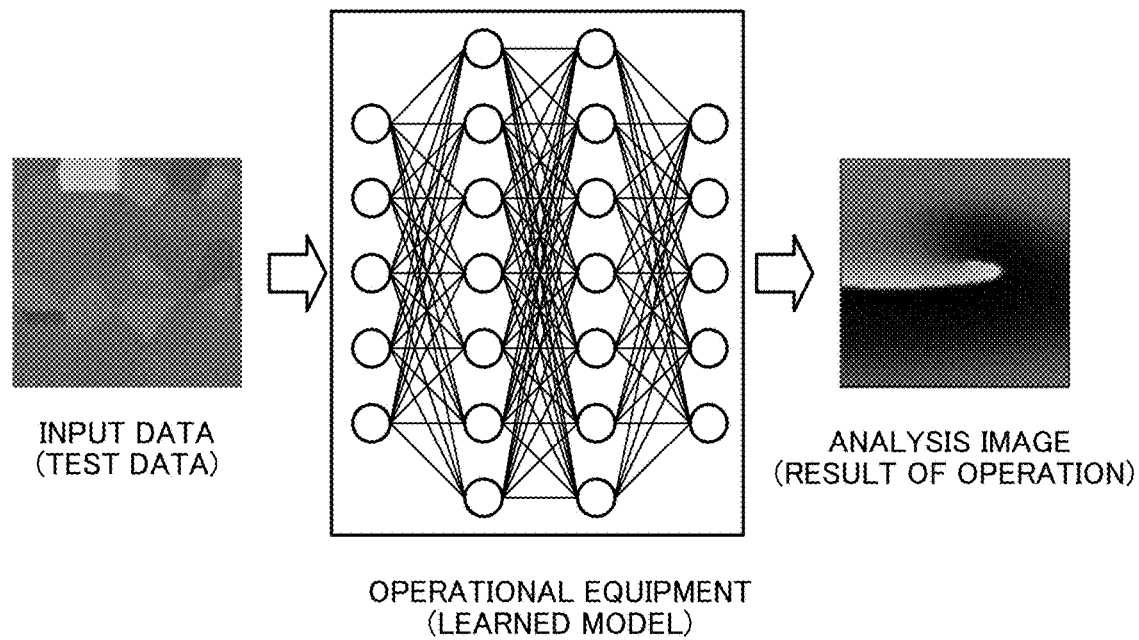
FIG. 8 is an explanatory diagram illustrating the concept of a process of applying signal maps as input data to a learned model to generate analysis images.

The following describes evaluating a final inference of the learned model by using test data. The electrode arrangement estimation process applies the input data of each of the signal maps (time series maps) with respect to the N second electrode arrays generated at step S130 to corresponding one of the learned models obtained at step S140 to generate N analysis images (time series image: moving image) (step S150). FIG. 8 illustrates the concept of a process of applying the input data to the learned model to generate analysis images. The electrode arrangement estimation process subsequently compares the N analysis images generated with the image of the teacher data and selects an electrode array corresponding to an analysis image that is best matched with the image of the teacher data among the N analysis images, as a selective electrode array (step S160). For example, one procedure of determining the matching degree of each analysis image with the image of teacher data may divide each image into divisional images of pixels that allow for detection of the excitation wave, specify an allowable range of luminance of each divisional image, compare the luminance of each divisional image of the analysis image with the luminance of each divisional image of the image of teacher data, and determine the matching degree of the analysis image with the image of teacher data as the number of divisional images having the luminance exceeding the allowable range (estimation error) or by visual observation. At step S160, an electrode array corresponding to an analysis image having the smallest estimation error is selected as a selective electrode array. Between step S140 and S150, the electrode arrangement estimation process may evaluate the result of learning by using verification data that is not used at step S140. In this case, test data used at step S150 is a data set that is not used as the training data or the verification data.

Figure 9:
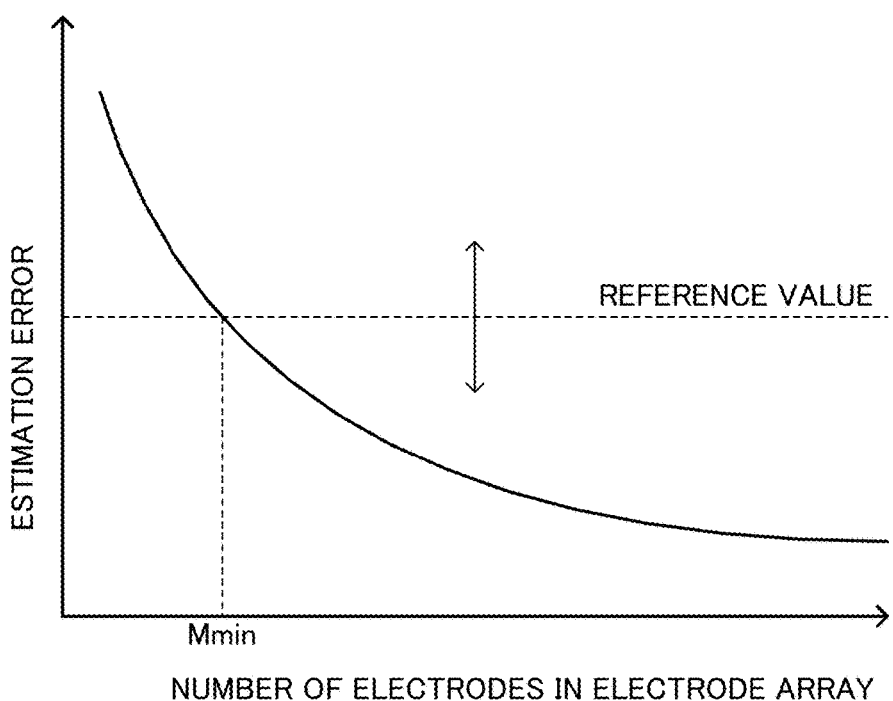
FIG. 9 is an explanatory diagram illustrating one example of a relationship between the number of electrodes in an electrode array and the estimation error.

The electrode arrangement estimation process subsequently determined whether the analysis image obtained by the selective electrode array is an image in an allowable range for detection of the excitation wave (step S170). By using the estimation error described above, this determination is performed as a determination of whether the value of estimation error is equal to or less than a reference value. FIG. 9 illustrates one example of a relationship between the number of electrodes in an electrode array and the estimation error. As illustrated, the estimation error increases with a decrease in number of electrodes in the electrode array. The reference value is varied depending on the accuracy required for an event of detection with respect to the excitation wave. For example, the reference value is expected to be a relatively large value for detection of the presence or the absence of excitation wave and is expected to be a relatively small value for detection of specifying the position of the center of rotation of the rotating excitation wave. The number of electrodes M min at an intersection of the number of electrodes in the electrode array, an estimation error curve, and the reference value represents a minimum number of electrodes in the electrode array in the allowable range.

When it is determined at step S170 that the analysis image obtained by the selective electrode array is the image in the allowable range for detection of the excitation wave, there is a possibility of employing a "new" selective electrode array having an electrode arrangement of the less number of electrodes than the electrode arrangement of the current selective electrode array. Accordingly, the electrode arrangement estimation process goes back to step S110 and performs the processing of steps S110 to S170 with setting the selective electrode array as a "new" first electrode array. In this cycle, M and N may be the same values as or may be different values from those when step S110 is performed in a previous cycle. As a result of the processing of steps S110 to S170, when it is determined at step S170 that an analysis image obtained by a "new" selective electrode array is an image in the allowable range for detection of the excitation wave, this "new" selective electrode array can be set as a "next new" first electrode array (in the description hereinafter, a "new" first electrode array and a "next new" first electrode array may be collectively referred to as the "first electrode array", and a "new" second electrode array may be referred to as the "second electrode array").

Figure 10:
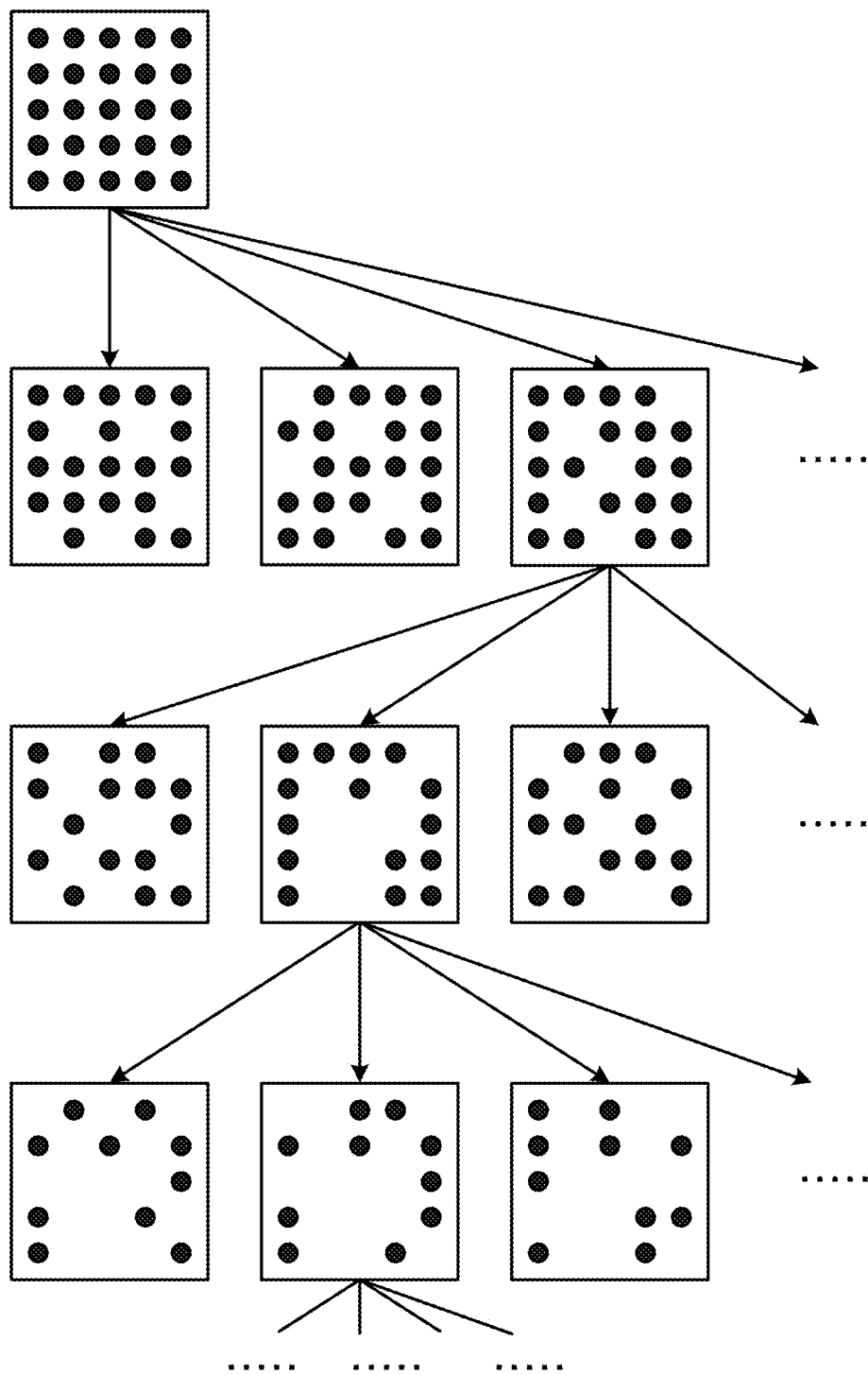
FIG. 10 is an explanatory diagram illustrating one example of a process of decreasing the number of electrodes by five each time from an electrode array having twenty five electrodes arranged and arrayed in five rows by five columns in a plane.

Repeating the processing of these steps S110 to S170 is equivalent to repeating a process of setting a selective electrode array as the first electrode array and decreasing the number of electrodes in a stepwise manner to select a selective electrode array of the less number of electrodes. As one example of this process, FIG. 10 illustrates one example of a process of decreasing the number of electrodes by five each time from an electrode array having twenty five electrodes arranged and arrayed in five rows by five columns in a plane. In the example of FIG. 10, among N second electrode arrays of twenty electrodes shown on the second level, the second electrode array at the third position from the left is selected as a selective electrode array corresponding to an image that is best matched with the image of teacher data. Among N second electrode arrays of fifteen electrodes shown on the third level, the second electrode array at the second position from the left is selected as a selective electrode array corresponding to an image that is best matched with the image of teacher data. Among N second electrode arrays of ten electrodes shown on the fourth level, the second electrode array at the second position from the left is selected as a selective electrode array corresponding to an image that is best matched with the image of teacher data.

In the example shown in FIG. 10, in the case of further repeating steps S110 to S170 in response to YES at step S170, a predetermined number of (five in this example) of the electrodes are eliminated, irrespective of the number of times of repetition. The number of electrodes to be eliminated may, however, not be the predetermined number but may be varied according to the number of times of repetition. Unlike the example shown in FIG. 10, the number of electrodes to be eliminated may be decreased with an increase in the number of times of repetition. For example, in the case of shifting from the second level to the third level in the illustration (the number of times of repetition is the first time), the number of electrodes to be eliminated may be five. In the case of shifting from the third level to the fourth level in the illustration (the number of times of repletion is the second time), the number of electrodes to be eliminated may be three that is less than five.

In the course of repetition of steps s110 to S170, when it is determined at step S170 that the analysis image obtained by the selective electrode array is not the image in the allowable range for detection of the excitation wave, this means that there is no electrode arrangement of providing a desired level among the second electrode arrays (N different electrode arrangements) selected in the current cycle. In this case, the electrode arrangement estimation process selects the selective electrode array selected by a previous cycle of the processing of steps S110 to S170 as an optimum electrode array (step S180) and is then terminated. By decreasing the value M and increasing the value N at step S110, an electrode array having the minimum number of electrodes is selected as the optimum electrode array, among the electrode arrays having the estimation errors in the allowable range. The optimum electrode array obtained as described above is used to detect the excitation wave of the biological tissue and to specify the position of the center of rotation of the rotating excitation wave.

When the value M that is the number of electrodes to be eliminated is a value of not less than 2, the electrode arrangement estimation process may not proceed to step S180 in response to NO at step S170 but may further adjust the number of electrodes and repeat steps S110 to S170. More specifically, in the example of FIG. 10, it is assumed that the second electrode array at the third position from the left among the N second electrode arrays of twenty electrodes on the second level in the illustration is selected as the selective electrode array corresponding to the image that is best matched with the image of teacher data and that the analysis image obtained by this selective electrode array is determined to be the image in the allowable range for detection of the excitation wave at step S170 (in the case of YES at step S170). In this case, the electrode arrangement estimation process goes back to step S110. It is then assumed that the second electrode array at the second position from the left among the N second electrode arrays of fifteen electrodes on the third level is selected as the selective electrode array corresponding to the image that is best matched with the image of teacher data and that the analysis image obtained by this selective electrode array is determined to be not the image in the allowable range for detection of the excitation wave at step S170 (in the case of NO at step S170). In this case, the numbers of electrodes equal to nineteen to sixteen are not subjected to the processing of steps S110 to S170. There is accordingly a possibility one of the numbers of electrodes equal to nineteen to sixteen may be the minimum number of electrodes.

When the value M that is the number of electrodes to be eliminated is a value of not less than 2, in the case of NO at step S170, the electrode arrangement estimation process may increase the number of electrodes based on the number of electrodes that gives NO at step S170 and subsequently repeat steps S110 to S170. More specifically, when the number of electrodes equal to fifteen gives NO at step S170, the electrode arrangement estimation process increases the number of electrodes by two, based on the number of electrodes equal to fifteen, to the number of electrodes equal to seventeen and then repeats steps S110 to S170. When the number of electrodes equal to seventeen gives NO at step S170, the electrode arrangement estimation process increases the number of electrodes by one or two, based on the number of electrodes equal to seventeen and then repeats steps S110 to S170. When the value M that is the number of electrodes to be eliminated is a value of not less than 2, in the case of YES at step S170, on the other hand, the electrode arrangement estimation process may decrease the number of electrodes based on the number of electrodes that gives YES at step S170 and subsequently repeat steps S110 to S170. More specifically, when the number of electrodes equal to seventeen gives YES at step S170, the electrode arrangement estimation process may decrease the number of electrodes, based on the number of electrodes (seventeen) giving YES, to the number of electrodes equal to sixteen and then repeat steps S110 to S170. When the number of electrodes equal to sixteen gives NO at step S170, the number of electrodes equal to seventeen is the minimum number of electrodes. The procedure of decreasing/increasing the number of electrodes based on the number of electrodes giving YES/NO at step S170 and repeating steps S110 to S170 in this manner may determine the optimum number of electrodes (minimum number of electrodes) between twenty and fifteen. When the value M that is the number of electrodes to be eliminated is a value of not less than 2, in the case of NO at step S170, the electrode arrangement estimation process may decrease the number of electrodes by one based on a previous number of electrodes (the last number of electrodes that gives YES at step S170) and then repeat steps S110 to S170. The procedure of determining the minimum number of electrodes is not limited to these examples but may be set appropriately.

FIG. 11 is an explanatory diagram illustrating electrode arrays corresponding to images that are best matched with an image of teacher data, their signal maps and their analysis images when the number of electrodes is decreased by five each time from an electrode array having twenty five electrodes arranged and arrayed in five rows by five columns in a plane, along with the image of teacher data. As understood from the analysis images, the number of electrodes equal to five may be sufficient for detection of the presence or the absence of excitation wave. It is, however, expected that the required number of electrodes is equal to ten or more to specify the position of the center of rotation of the rotating excitation wave.

The method for estimating the arrangement of electrodes on the biological tissue according to the embodiment described above first attaches an initial electrode array having a sufficient number of electrodes for detection of excitation wave arranged and arrayed in a plane, to biological tissue; and obtains detection signals at the respective electrodes of the initial electrode array. The method subsequently sets the initial electrode array as a first electrode array; sets N signal maps obtained on the basis of detection signals obtained at respective electrodes in N second electrode arrays that are generated by eliminating M electrodes at random from the first electrode array, as N input data (N training data); sets an image of excitation wave in the process of obtaining the detection signals at the respective electrodes by using the initial electrode array, as teacher data; and obtains a relationship between the input data and the image of the excitation wave as a learned model. The method applies N input data as N test data to the learned model, so as to generate N analysis images; and selects a second electrode array corresponding to an analysis image that is best matched with the image of the teacher data, among the N analysis images, as a selective electrode array. The method repeats the process of obtaining the learned model by setting the selected selective electrode array as the first electrode array and the process of selecting the selective electrode array, so as to select a selective electrode array having a minimum number of electrodes and providing an analysis image in an allowable range with respect to the image of the teacher data, as an optimum electrode array. The number of and the arrangement of electrodes in this optimum electrode array are more appropriate for detection of the excitation wave of the biological tissue. This configuration estimates the more appropriate arrangement of the electrodes for detection of the excitation wave of the biological tissue. Furthermore, the method uses the detection signals to adjust interpolation signals between electrodes in an electrode array by a nearest neighbor algorithm. This configuration enables the signals between the electrodes to be included in the input data and obtains the more appropriate learned model.

The method for estimating the arrangement of electrodes on the biological tissue according to the embodiment described above repeats the process of obtaining the learned model by setting the selected selective electrode array as the first electrode array and the process of selecting the selective electrode array, so as to select a selective electrode array having a minimum number of electrodes and providing an analysis image in an allowable range with respect to the image of the teacher data, as an optimum electrode array. A modification may sets the initial electrode array as the first electrode array to obtain the learned model and select a selective electrode array selected based on the learned model, as the optimum electrode array. In other words, the repetition may not be performed.

The method for estimating the arrangement of electrodes on the biological tissue according to the embodiment described above uses the detection signals to adjust the interpolation signals between the electrodes in the electrode array by the nearest neighbor algorithm. One modification may not perform interpolation between the electrodes.

Some aspects of the present disclosure are described above with reference to the embodiments. The present disclosure is, however, not limited to these embodiments but may be implemented by a variety of other aspects within the scope of the present disclosure.

INDUSTRIAL APPLICABILITY

The present disclosure is applicable to the manufacturing industry using the method of estimating the arrangement of electrodes on the biological tissue and the like.

The invention claimed is:

1. A method for optimizing an arrangement of electrodes on biological tissue to detect excitation waves, the method comprising:
   a signal obtaining step of
      setting a first electrode array, arranged and arrayed on a plane, the first electrode array having a plurality of electrodes such that the excitation wave can be detected,
      with the electrodes being attached to the biological tissue, obtaining first detection signals from respective electrodes of the plurality of electrodes of the first electrode array,
      generating a first moving image based on the first detection signals,
      setting a plurality of second electrode arrays that are generated by eliminating a predetermined number of electrodes at random from the first electrode array,
      with the electrodes being attached to the biological tissue, obtaining a plurality of second detection signals from respective electrodes of each of respective second electrode arrays, and
      generating a plurality of second moving images based respectively on each of the plurality of second detection signals,
   a learned model obtaining step of obtaining a learned model by
      using the plurality of second moving images as input data,
      using the first moving image as teacher data, and
      learning a relationship between the input data and the teacher data by deep learning;
   an electrode array selecting step of selecting a second electrode array from the plurality of second electrode arrays as a selective electrode array by
      applying the plurality of second moving images to the learned model to generate a plurality of analysis images;
      matching an analysis image among the plurality of analysis images to the first moving image, and
      selecting the selective electrode array as the second electrode array corresponding to the matched analysis image;
   an electrode arrangement estimating step of estimating a number of and an arrangement of electrodes in a third electrode array based on a number of and an arrangement of the electrodes in the selective electrode array; and implementing the third electrode array on the biological tissue to detect the excitation waves of the biological tissue.

2. The method for optimizing the arrangement of respective electrodes of the plurality of second electrode arrays on the biological tissue according to claim 1, wherein the input data is adjusted, based on interpolation signals between electrodes obtained by interpolating detection signals at the electrodes by a nearest neighbor algorithm.

3. The method for optimizing the arrangement of the electrodes on the biological tissue according to claim 1, wherein the learned model obtaining step and the electrode array selecting step are performed repeatedly by using the selective electrode array selected by the electrode array selecting step, as the first electrode array.

4. The method for optimizing the arrangement of the electrodes on the biological tissue according to claim 3, wherein when an analysis image obtained by the selective electrode array is out of a predetermined range with respect to the image of the teacher data, the electrode arrangement estimating step specifies the selective electrode array selected in a previous cycle of the electrode array selecting step, as the selective electrode array.

5. The method for optimizing the arrangement of the electrodes on the biological tissue according to claim 2, wherein the learned model obtaining step and the electrode array selecting step are performed repeatedly by using the selective electrode array selected by the electrode array selecting step, as the first electrode array.

6. The method for optimizing the arrangement of the electrodes on the biological tissue according to claim 5, wherein when an analysis image obtained by the selective electrode array is out of a predetermined range with respect to the image of the teacher data, the electrode arrangement estimating step specifies the selective electrode array selected in a previous cycle of the electrode array selecting step, as the selective electrode array.

* * * * *